United States Patent [19]
Crits

[11] 3,719,591
[45] March 6, 1973

[54] METHOD FOR CONDENSATE FILTRATION AND DEMINERALIZATION

[75] Inventor: George J. Crits, Havertown, Pa.
[73] Assignee: Crane Co., Chicago, Ill.
[22] Filed: March 5, 1971
[21] Appl. No.: 121,493

[52] U.S. Cl. .................................210/33, 210/283
[51] Int. Cl. ..............................................B01d 15/02
[58] Field of Search....210/30, 33, 80, 189, 190, 279, 210/283, 284, 335

[56] References Cited

UNITED STATES PATENTS

| | | | |
|---|---|---|---|
| 2,773,829 | 12/1956 | Hunting | 210/80 X |
| 2,772,236 | 11/1956 | Coonradt et al. | 210/284 X |
| 3,414,508 | 12/1968 | Applebaum et al. | 210/33 X |
| 2,334,802 | 11/1943 | Zuckermann | 210/335 |

FOREIGN PATENTS OR APPLICATIONS

| 849,979 | 9/1960 | Great Britain | 210/284 |
|---|---|---|---|

Primary Examiner—Samih N. Zaharna
Attorney—Smith, Harding, Early & Follmer

[57] ABSTRACT

Two beds of ion exchange materials are arranged in series in a single tank for downflow of condensate. The upper bed is a cation exchange resin, an anion exchange resin, or a mixture of anion and cation exchange resins, for the purpose of primary demineralization and for filtration under conditions in which scrubbing is required more frequently than chemical regeneration. The lower bed also consists of ion exchange material, cation or anion exchange resin, or a mixture of such resins, but effects final polishing and requires either relatively infrequent regeneration, or may be discarded. This lower bed is protected from receiving filterable solids by reason of the filtering action of the upper bed. The apparatus involved prevents bed admixture which might otherwise result from removal of the upper bed for scrubbing (and regeneration) and its return for use.

2 Claims, 2 Drawing Figures

PATENTED MAR 6 1973　　3,719,591

INVENTOR
GEORGE J. CRITS

BY
Smith Harding Earley & Follmer
ATTORNEYS

METHOD FOR CONDENSATE FILTRATION AND DEMINERALIZATION

BRIEF SUMMARY OF THE INVENTION

In many instances, in demineralization of condensate situations arise in which filterable solid materials (such as metal oxides) accumulate at a rate in an initial ion exchange bed requiring scrubbing of the bed, to remove solids separated by filtration, at intervals considerably less than intervals requiring chemical regeneration of that bed to maintain satisfactory ion exchange. The removal of these solid materials is required to avoid objectionable pressure drops. While times may vary considerably for individual installations, the situation involved may be best understood from a consideration of some typical figures.

For example, suppose that the upper bed requires scrubbing to remove the accumulated solid materials, resulting from filtering action, every 15 days. In this time it is possible that only 1 or 2 kilograins per cubic foot of ion exchange activity may have resulted in contrast with a full capacity of 8 to 12 kilograins per cubic foot of the bed. This is, the bed would normally be scrubbed a substantial number of times before it would require chemical regeneration.

An additional downstream polisher is usually desired comprising expensive material and this may be provided in accordance with the invention as the lower bed. This will normally require regeneration at even longer intervals than the upper bed because it may contain after a comparable time of operation a relatively smaller amount of accumulated ionic matter or material. Alternatively, it may be economical to discard it. It is also possible to use the material of this lower bed to provide part of the upper bed since it is still there usable even though no longer desirable as material of the lower bed.

In accordance with the invention a single tank may be used for both beds; and this is possible because of the provision of an arrangement which, in effect, locks the lower bed in position despite the removal and replacement of the upper bed. What is desired is prevention of contamination of the lower bed by material in the upper bed, both separated solid contamination and ion exchange material which is partially exhausted.

Typical operation may involve scrubbing of the upper bed at intervals of 10 days, regeneration of the upper bed at intervals of 45 to 60 days, and regeneration or discard of the lower bed at intervals of 60 to 180 days.

DETAILED DESCRIPTION

Figure 1:
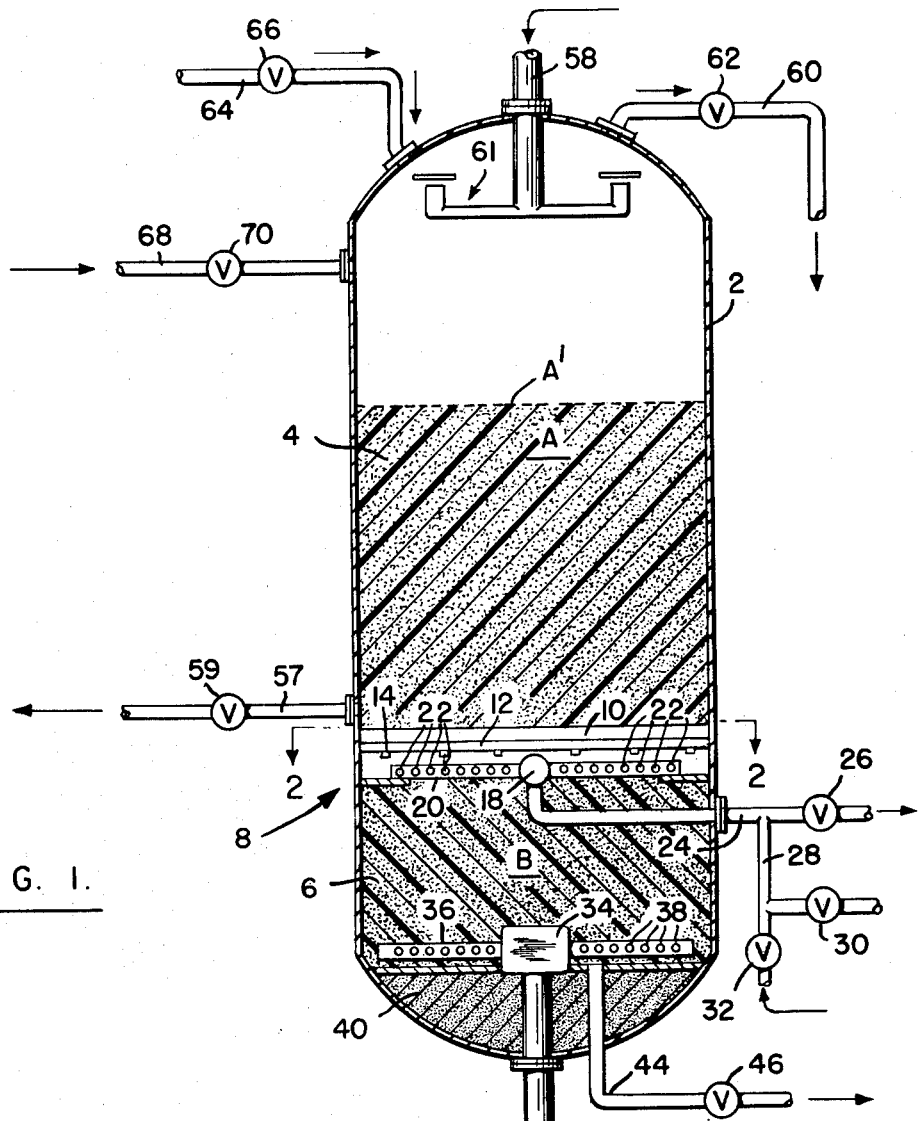
FIG. 1 is a vertical section showing a typical tank for the practice of the invention.

The invention may be best understood from a description of the apparatus shown in the drawing, followed by a description of the bed compositions, and then a description of a typical operation.

Figure 2:
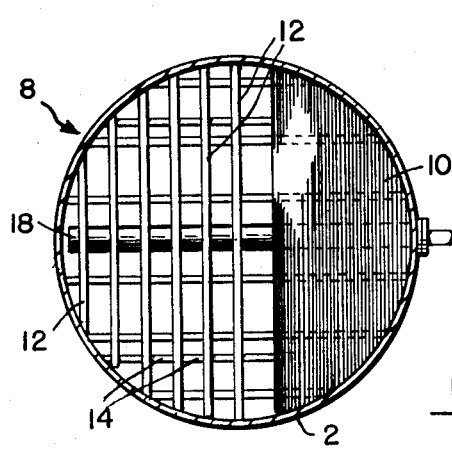
FIG. 2 is a transverse section, with parts omitted from portions thereof, taken on the horizontal plane indicated at 2—2 in FIG. 1.

A tank 2 may be shaped as illustrated in FIG. 1 as a vertical cylinder with rounded top and bottom ends though it may be formed with a lower portion of reduced diameter to accommodate a lower bed of ion exchange resin in which, for a given volume, the depth is increased to lengthen the path of vertical flow. An upper region 4 of the tank contains a resin bed A, of ion exchange resin (single or mixed), having its upper surface at a level such as A'. A region 6 contains a lower ion exchange resin bed B. The two regions 4 and 6 are delimited by a resin "locking" structure designated generally at 8 and illustrated in detail in FIG. 2 which shows a preferred structure. A grating 10 consists of parallel spaced bars 12. These bars are subject to variations of dimensions, but typically may have a height of the order of ⅝ inch to 2-½ inches with thicknesses of about ⅛ inch to ¼ inch spaced ¼ inch to ¾ inch. These bars may be conveniently grouped into assemblies by being welded to wires (not shown), the complete grating, covering the entire cross-section of the tank, being made up of such groups of bars which may be located through manholes (not shown) to rest on more widely spaced supporting bars 14. Beneath the grating there is located a water distribution and collection assembly comprising a header 18 communicating with branch pipes 20 provided with holes 22 for inflow and outflow of water during operations described hereafter. The holes are of such size as to prevent flow of resin therethrough. Alternatively pipes with larger holes may be covered with screens to prevent flow of resin beads. The header is connected to a pipe 24 extending to the exterior of the tank and provided with a valve 26. A branch of this pipe indicated at 28 is provided with valves 30 and 32 for manipulation as hereafter described.

While the grating and the distributor-collector are shown as separate elements, they may be combined into a single structure providing the upflow passages of the type already mentioned and also for the inflow and outflow of water, and particularly upflow through the passages. These passages may be holes in a plate structure which will produce the same results as a grating in preventing the bed materials from becoming admixed. Small holes for preventing passage of the ion exchange materials may be provided, or larger holes may be screened as indicated above.

At the bottom of the tank there is the space 40 containing a fill of granular material to support a flat deck 41, of plastic or plastic coated metal, above which is located a header 34 communicating with branch pipes 36, having perforations 38 comprising screening to draw off the treated water while holding the ion exchange material, outward flow taking place through the pipe 42 having a main control valve 43. The underdrain construction may alternatively be that of Pratt et al. U.S. Pat. No. 3,291,311.

An outflow connection is also provided at 44 controlled by a valve 46. Ion exchange resin may be removed through this connection from the space above the deck 41.

The valve 43 is bypassed by a connection 48 controlled by a valve 50, with a reentrant connection at 52. A branch is provided at 54 controlled by a valve 56.

A lateral outlet connection 57 controlled by a valve 59 is provided above the grating arrangement for removal of resin of bed A.

The main inflow connection is illustrated at 58 and runs to the conventional water distribution arrangement 61.

A venting connection 60 is controlled by a valve 62.

Water for transfer purposes may enter the connection 64 at the top of the tank, the connection being controlled by a valve 66. However, most of the water for transfer may flow through the pipe 24 under control of valve 32, passing from the distributor assembly upwardly through the grating 10.

A passage 68 is provided for resin introduction in the form of a slurry, with control by the valve 70.

Reference may now be made to the compositions of the resin beds:

The upper bed may consist of either single resins or mixed cation and anion exchange resins of many types depending upon the demand involved. As an example of a mixed resin bed, the mixed resins may be in the range of 20 to 60 standard mesh, with the cation exchange resin being, for example, Amberlite 200 (of Rohm and Haas) or Dowex 50W (of Dow Chemical Co.), while the anion exchange resin might be Amberlite 400 or 900 or Dowex SBR-P (respectively of the named companies). The ratio of cation exchange resin to anion exchange resin may be typically 2:1 or 3:1. What has just been referred to is quite typical for treatment of usual condensates; but it will be readily understood by those skilled in the art what equivalent or other resins may be used which may be more suitable for special treatments.

The total dissolved solids may be of the order of 10 parts per billion and may usually consist of traces of sodium chloride, calcium chloride and magnesium chloride arising from coolant leakage. It may be here noted that solids, usually iron and copper oxides, may be present in amounts of around 15 to 30 parts per billion, resulting from corrosion.

Instead of using mixed resins, the upper bed may consist of cation exchange resin alone, or even anion exchange resin, depending upon the desired treatment involved. The resin or resins may be particularly of types specially suited for effecting filtration as well as ion exchange.

The lower bed B may consist of mixed resins of the same or different composition as the bed A. However, the composition of the lower bed may be otherwise, depending upon the requirements involved, and the lower bed may consist of a single resin of either exchange type.

In a complete condensate treating apparatus the units referred to will generally be used in batteries consisting of, typically, five or more units so that the condensate treatment may continue while one or even more units are out of operation for either scrubbing or regeneration as described hereafter. The operating units will then function in parallel.

While the exchanger unit is onstream, the condensate being treated flows in at 58 and downwardly through the beds A and B in series, to emerge through the outflow line 42. During this operation the upper bed A acts as a filter to remove such solid materials as metal oxides, and conventional ion exchange takes place through the normal actions of the cation and anion exchange resins. The grating at 10 provides little impedance to flow, which continues through the bed B which effects polishing. As previously noted, this bed may also contain a mixture of cation and anion exchange resins, though in some cases it may comprise only a cation exchange resin or an anion exchange resin as noted. While during this operation the outlet 24 will ordinarily be closed, it may be opened from time to time by the opening of valve 30 to take off samples to monitor the action of the upper bed both from the standpoint of ion leakage and of the appearance of any solid materials in the effluent from the upper bed.

As discussed above, the event which ordinarily requires taking the unit out of operation is too great an accumulation of solid materials which have been removed by filtration action. When the monitoring indicates this, the onstream operation may be interrupted, by cutting off the inflow of condensate. However, experience with operation may establish a time interval after which, as a precautionary measure, scrubbing of the upper bed should take place. Tests of conditions of operation normal for the installation may establish a time interval, the actual monitoring being used only to detect abnormal conditions which should desirably not be reached. Whatever the criteria may be, after the onstream operation is terminated the upper bed is desirably removed to another vessel for the purpose of scrubbing. What is particularly desirable at this time is that the removal should not disturb the lower bed B either in the sense of removing any substantial amount of its material or permitting the material of the upper bed or its filtered-out solids from entering the lower bed. To accomplish this result, valve 59 is opened to permit outflow of the material of the upper bed while inflow of water at a low rate is provided through the distributor 18, 20 by opening of the valve 32. Transfer water enters at 64, valve 66 being opened, to force the material of the upper bed outwardly in the form of a slurry. Valves 43, 46, 50 and 56 are closed at this time. While the slurry is leaving through connection 57, a relatively slow flow of water takes place upwardly through the grating 10 and this effectively prevents any possible downflow of material through the grating, the slow flow also preventing any substantial upflow of the material of the bed B through the grating. There is thus a hydraulic locking of the respective beds above and below the grating.

The removed material of the bed A along with the filtered-out solids is passed into a vessel for scrubbing. While the scrubbing may be accomplished in different fashions, a desirable and preferred type of scrubbing may be carried out in accordance with my U.S. Pat. No. 3,455,819. In the operation being discussed there is no chemical regeneration of the materials of bed A and the resins need not be separated, the operation being essentially only that of removing the filtered-out material as a result of the action of the upper bed as a filter only, the ion exchange properties of the upper bed being still sufficient to permit extended further use for this purpose. Thus the treatment at this time is lessened as compared with that which would involve a regeneration.

After the scrubbing operation, the scrubbed material may be temporarily stored in a storage tank for return ultimately to the same unit or another unit of the complete battery thereof. In order to minimize the time during which the unit treated as just described is out of normal operation, scrubbed material from a storage tank may be promptly returned to the unit, and for this purpose a slurry thereof is introduced through connection 68 and open valve 70 with displacement of air through the vent outlet 60, the valve 62 of which is open. Desirably a slow inflow of water continues through the distributor system and open valve 32, but after some of the resin has settled, the valve 32 may be closed and valve 26 opened to permit excess water of the slurry to pass outwardly. Desirably a slow flow of water takes place upwardly during this operation through the lower bed, the water for this purpose being introduced through connection 48. This water flows outwardly through the distributor 20, the upflow preventing contamination of the lower bed. Valve 59 is closed during this replacement of the bed A. Valve 66 will have been closed before this action takes place, so that air could fill the upper portion of the tank through the vent provided by the opening of valve 62. The unit is then returned to onstream operation, the air being first displaced through the vent by water.

As indicated, there may well occur a number of scrubbings of a particular unit batch of mixed resin A before its ion exchange characteristics have been reduced to a point requiring regeneration as well as scrubbing. When such a batch of resin reaches the point for chemical regeneration, removal takes place as just described, but after removal not only does scrubbing take place but also regeneration, involving the usual separation of the two resins and their separate regeneration by acid and alkali, followed by readmixture and then return, as described, to a unit from either a storage tank or directly after admixing. The regeneration may be carried out in any conventional fashion, and may be carried out in accordance with the procedure of Crits et al. U.S. Pat. No. 3,385,787 or Applebaum et al. U.S. Pat. No. 3,414,508.

At still longer intervals than those involving regeneration of an upper bed, a lower bed will require either regeneration or replacement. The procedure for replacement is simple, since, at a time after the upper bed is removed from a demineralizer unit, the lower bed may be removed through the outflow connection 44, with inflow of water through the opened valve 32 and the distributor 20, 22; and/or through 48 by opening of valve 50. This lower bed can then be replaced by a fresh bed or from a storage tank containing a regenerated bed which previously functioned as a lower bed. If regeneration is to be effected, the procedure after removal will be conventional; if the bed is of cation exchange resin only, then regeneration for this type of material is used; if it is a mixed bed, regeneration may be effected as described heretofore for an upper bed. If desired, the material of a lower bed about to be discarded or regenerated may be used as make-up for an upper bed.

It will be understood that the demineralizer may operate in an ammoniated system of the types described in the patents referred to above.

From what has been described, it will be evident that the advantages of the invention may be summarized as follows, the general objective being the minimizing of production of chemical wastes and the minimizing of chemical usage.

It is applicable to a demineralizing system particularly for high purity condensate which is to be maintained of high quality for boiler feed. In such case, important aspects are filtering to remove solids along with ion exchange to remove ions which may enter the system through leakage or make-up of water. To avoid cost and times involved in maintenance of ion exchange beds, scrubbing of an upper bed is performed at intervals requiring that action, but without chemical regeneration of the ion exchange materials until such regenerations are necessary. When that event occurs both scrubbing and chemical regeneration are carried out.

Then, further, either replacement or regeneration of the polishing material of a lower bed is carried out only when required, usually at intervals greater than those required for chemical regeneration of the upper bed.

These operations require prevention of admixture of the respective upper and lower beds in order to maintain the high quality of treatment. To this end, the ion exchange vessel is provided with a barrier of an essentially hydraulic type, particularly consisting of a grating which offers little flow resistance in normal operation for condensate treatment but, by provision of an upflow of water prevents resin transfer under conditions which, by turbulence, might ordinarily cause admixture of the beds which should remain separated. In particular, this is effective when the upper bed is being removed or replaced.

It will be understood that the tank and its interior elements may be lined or coated with materials, such as rubber or polyvinyl chloride, which are not subject to corrosion by the water; or alternatively they may be formed of noncorrodible metal or of plastics where these are suitable for structural elements.

While the invention has been particularly described with reference to the construction and operation of a multi-bed ion exchange unit, it will be understood that such a unit is used in a multiple unit battery for a single installation and that the beds which have been described are not at all individual to particular units, i.e., tanks.

An upper bed, for example, after removal from one unit may very well be treated (scrubbed or regenerated) and then go to a storage tank to be used to replace an upper bed in some other unit, and where the periodic scrubbings or regenerations are referred to, they essentially refer to the beds rather than the units in which they may successively be used. Scheduling, of course, may be adopted in many ways so as to insure that a particular bed is properly treated when necessity for treatment exists.

It will be evident that the bed compositions may vary, including total and relative volumes in a single unit, depending upon the quality of condensate both treated and required. Specific materials, cycles of treatment, etc. are at the option of the user in accordance with the circumstances he encounters.

I claim:

1. A water demineralizing procedure comprising an onstream operation in which water is caused to flow downwardly in series through upper and lower beds, the upper bed comprising at least one ion exchange resin and capable of filtering solid materials from the water, and the lower bed comprising at least one ion exchange resin, said resins being located in a single vessel with a barrier between the beds comprising passages of substantial vertical extent, the procedure further involving removing the upper bed from the vessel and subjecting it to scrubbing to remove filtered-out solids without chemical regeneration, the removal of the upper bed being affected downwardly and outwardly from the vessel at a location above said barrier while water is caused to flow upwardly through the passages in the barrier to prevent the material of the upper bed and filtered-out material therein from becoming admixed with the material of the lower bed, then returning said scrubbed but unregenerated bed to the same or a similar vessel for further onstream operation, and repeating such removal and return for at least one similar scrubbing with ultimate following of a scrubbing with chemical regeneration thereof and return for further onstream operation as described.

2. The procedure of claim 1 in which the barrier is a grating of bars spaced to provide passages of greater height than width.

* * * * *